US012251929B2

(12) United States Patent
Tagami et al.

(10) Patent No.: US 12,251,929 B2
(45) Date of Patent: Mar. 18, 2025

(54) PRINTING DEVICE CAPABLE OF DRIVING PLATEN ROLLER AND CUTTER BY A SINGLE MOTOR

(71) Applicant: BROTHER KOGYO KABUSHIKI KAISHA, Nagoya (JP)

(72) Inventors: Yuya Tagami, Nagoya (JP); Shinji Ukai, Kiyosu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 185 days.

(21) Appl. No.: 18/187,256

(22) Filed: Mar. 21, 2023

(65) Prior Publication Data

US 2023/0302826 A1 Sep. 28, 2023

(30) Foreign Application Priority Data

Mar. 25, 2022 (JP) ................................ 2022-050442

(51) Int. Cl.
*B41J 15/04* (2006.01)
*B41J 2/32* (2006.01)
*B41J 11/70* (2006.01)

(52) U.S. Cl.
CPC ............... *B41J 15/044* (2013.01); *B41J 2/32* (2013.01); *B41J 11/703* (2013.01)

(58) Field of Classification Search
CPC ........... B41J 15/044; B41J 2/32; B41J 11/703
USPC ........................................................ 347/218
See application file for complete search history.

(56) References Cited

U.S. PATENT DOCUMENTS

2007/0147939 A1* 6/2007 Moriyama ......... G06K 19/0776 400/621
2009/0162125 A1* 6/2009 Kubota .................. B41J 3/4075 400/611
2019/0299657 A1* 10/2019 Mizutani ................ B65H 29/20

FOREIGN PATENT DOCUMENTS

JP 2008-114553 A 5/2008

* cited by examiner

*Primary Examiner* — Jason S Uhlenhake
*Assistant Examiner* — Alexander D Shenderov
(74) *Attorney, Agent, or Firm* — KENEALY VAIDYA LLP

(57) ABSTRACT

A printing device includes a cassette accommodation portion, a platen roller, a cutter, a motor, a first drive transmission portion and a second drive transmission portion. A printing cassette incorporating a printing tape is detachably attachable to the cassette accommodation portion. The platen roller is rotatable to convey the printing tape of the printing cassette. The first drive transmission portion is configured to transmit a drive force of the motor to the platen roller in a state where the printing cassette is attached to the cassette accommodation portion. The second drive transmission portion is configured to transmit the drive force of the motor to the cutter. The motor has at least a portion overlapping the cassette accommodation portion in a first direction parallel to a rotational axis of the platen roller.

13 Claims, 10 Drawing Sheets

PRINTING DEVICE CAPABLE OF DRIVING PLATEN ROLLER AND CUTTER BY A SINGLE MOTOR

REFERENCE TO RELATED APPLICATIONS

This application claims priority from Japanese Patent Application No. 2022-050442 filed on Mar. 25, 2022. The entire content of the priority application is incorporated herein by reference.

BACKGROUND ART

In a printing device configured to perform printing on a tape, a cassette accommodating a tape is mounted in and removed from a body of the printing device to supply and interchange the tape. One known configuration for such printing devices is configured to transmit a drive force of a single motor to both a platen roller for conveying the tape and a cutter for cutting the tape.

DESCRIPTION

In the conventional printing device described above, the motor is disposed outside a cassette accommodation portion. This configuration results in an increase in the size of the printing device in a direction orthogonal to a rotational axis of the platen roller.

In view of the foregoing, it is an object of the present disclosure to provide a printing device capable of driving a platen roller and a cutter with a single motor while suppressing an increase in the size of the printing device.

According to one aspect, the disclosure provides a printing device including: a cassette accommodation portion to which a printing cassette incorporating a printing tape is detachably attachable; a platen roller; a cutter; a motor configured to generate a drive force; a first drive transmission portion; and a second drive transmission portion. The platen roller is configured to rotate about a rotational axis to convey the printing tape of the printing cassette attached to the cassette accommodation portion. The cutter is configured to cut the printing tape. The first drive transmission portion is configured to transmit the drive force of the motor to the platen roller in a state where the printing cassette is attached to the cassette accommodation portion. The second drive transmission portion is configured to transmit the drive force of the motor to the cutter. The motor has at least a portion that overlaps the cassette accommodation portion in a first direction parallel to the rotational axis of the platen roller.

With this configuration, at least a portion of the motor overlaps the cassette accommodation portion (i.e., the printing cassette) in the first direction. This configuration enables the platen roller and the cutter to be driven by a single motor while suppressing an increase in the size of the printing device.

EMBODIMENT

1. Configuration

Figure 1A:
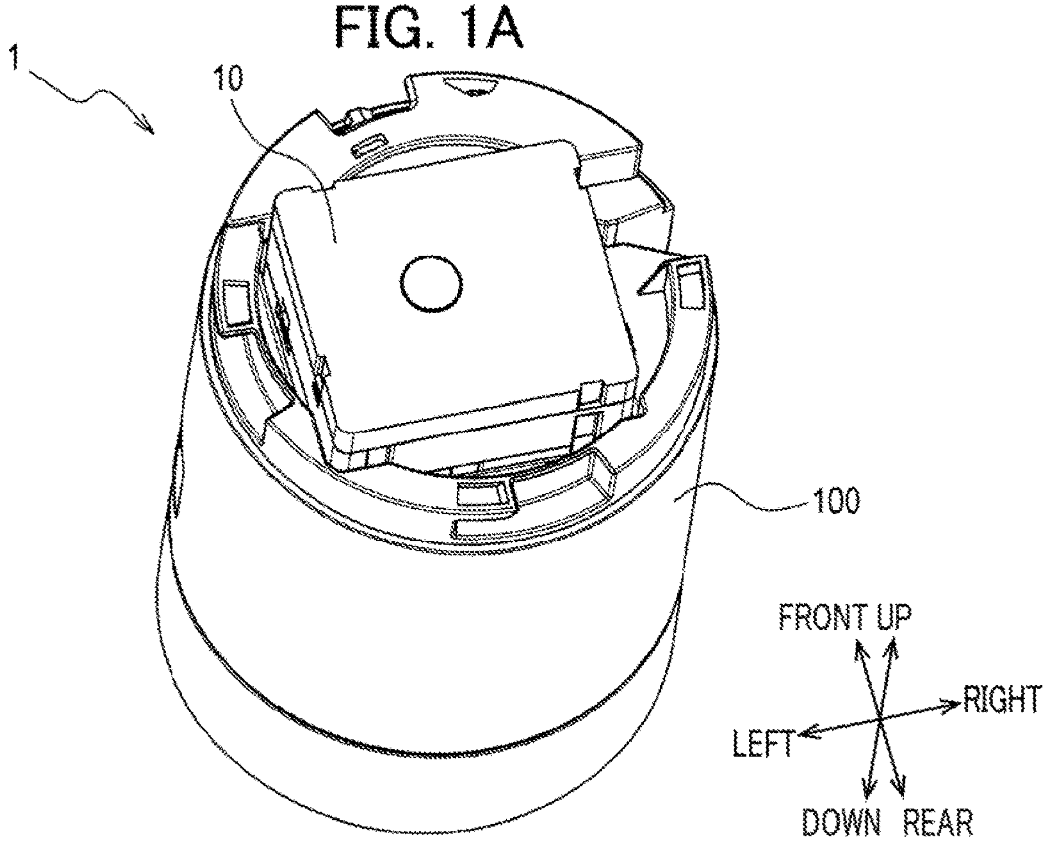
FIG. 1A is a schematic perspective view of a printing device according to one embodiment.

A printing device 1 illustrated in FIG. 1 includes a printing cassette 10, and a device body 100. The printing device 1 is configured to perform printing on a printing tape 11A in the printing cassette 10.

In the present embodiment, a direction parallel to a central axis of a printing tape roll 11 will be referred to as an up-down direction, a direction perpendicular to the up-down direction and parallel to a direction in which the printing tape 11A is discharged through an outlet 33C of the printing cassette 10 will be referred to as a left-right direction, and a direction perpendicular to both the up-down direction and the left-right direction will be referred to as a front-rear direction.

<Device Body>

Figure 1B:
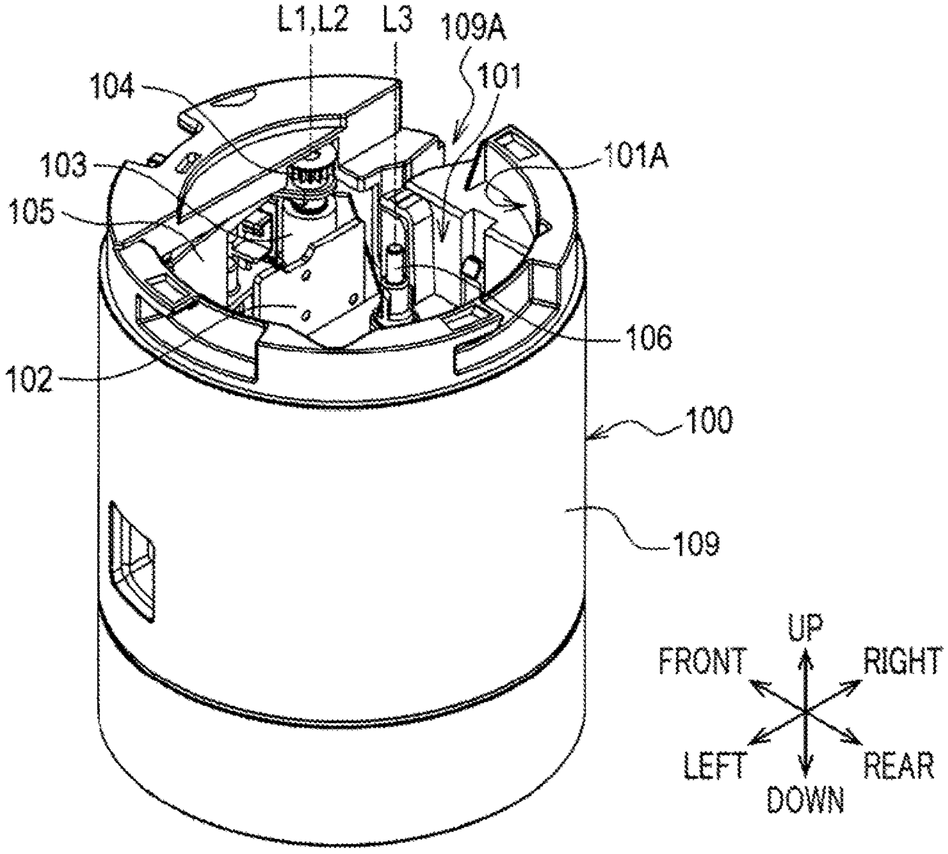
FIG. 1B is a schematic perspective view illustrating a device body of the printing device of FIG. 1A.

As illustrated in FIG. 1B, the device body 100 includes a cassette accommodation portion 101, a print head 102, a platen roller 103, a platen gear 104, a roller holder 105, a drive shaft 106, and a housing 109.

Figure 2A:
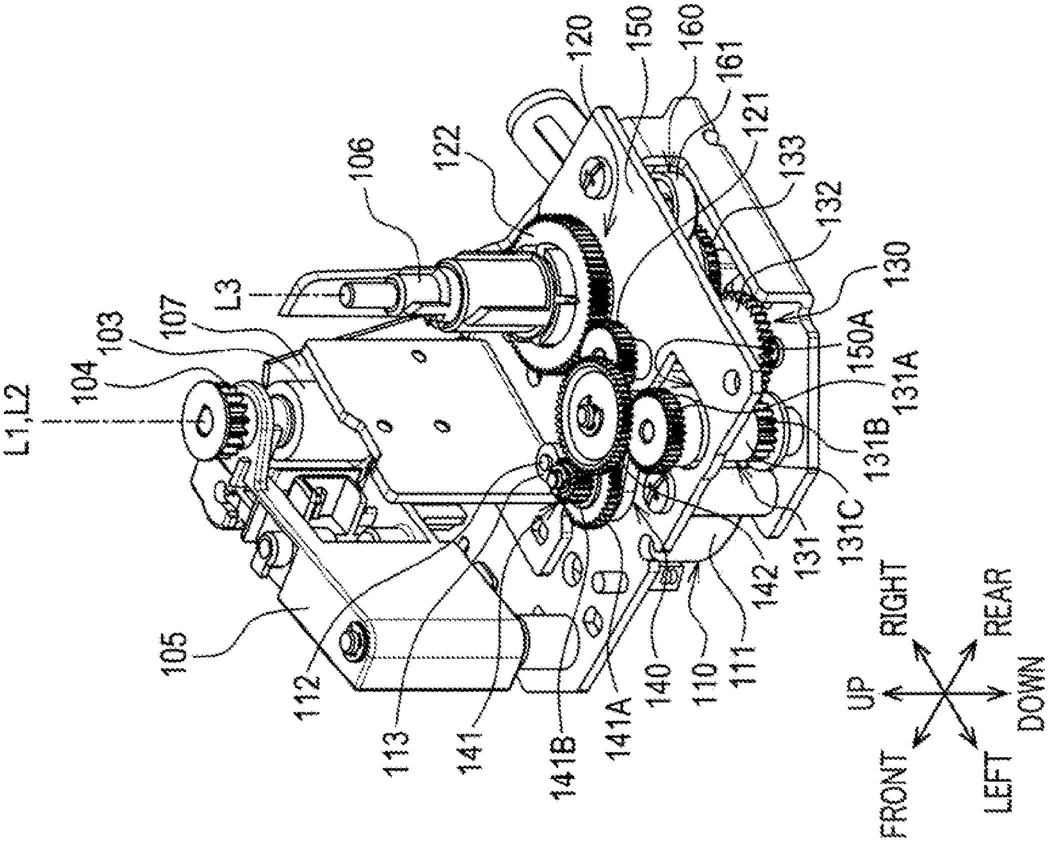
FIG. 2A is a schematic view illustrating an internal structure of the device body of FIG. 1B.
Figure 2B:
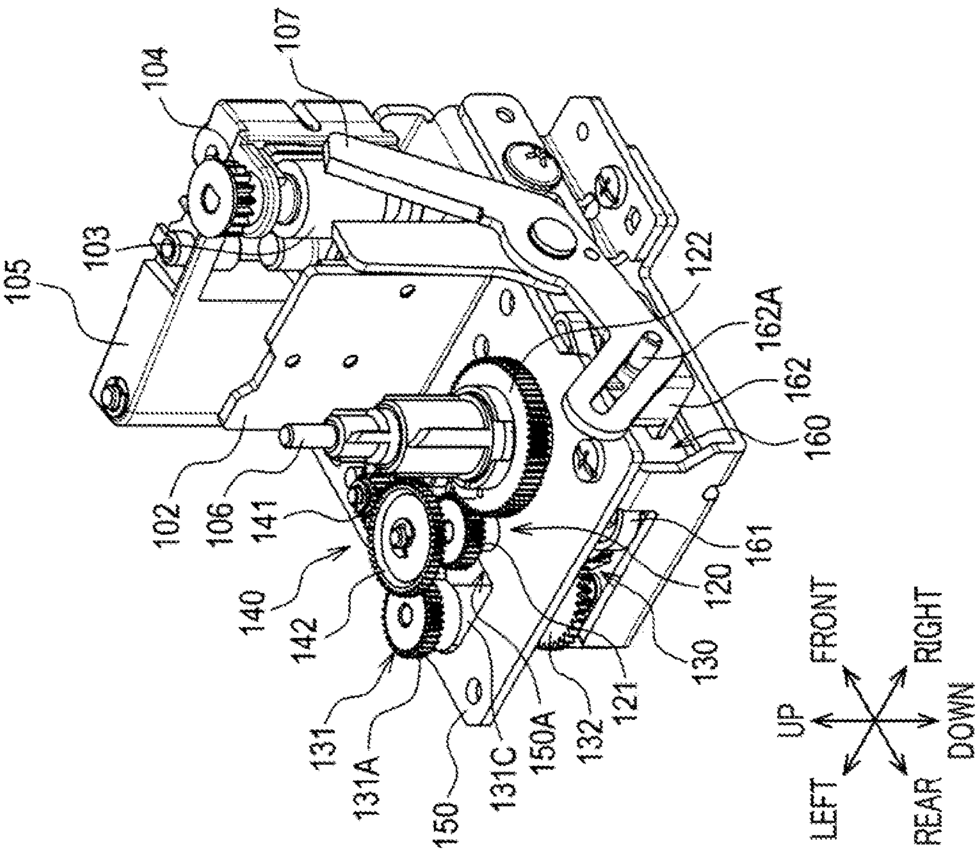
FIG. 2B is another schematic view illustrating the internal structure of the device body of FIG. 1B.

As illustrated in FIGS. 2A and 2B, the device body 100 further includes a cutter 107, a motor 110, a first drive transmission portion 120, a second drive transmission portion 130, a drive switching portion 140, a frame 150, and a cutter driving cam 160.

Cassette Accommodation Portion

The cassette accommodation portion 101 illustrated in FIG. 1B is a recess in which the printing cassette 10 is detachably mountable. The cassette accommodation portion 101 functions to provide positioning of the printing cassette 10.

The cassette accommodation portion 101 has an insertion opening 101A formed in the housing 109 to be open upward. The printing cassette 10 is inserted into the cassette accommodation portion 101 through the insertion opening 101A to be accommodated in the cassette accommodation portion 101. The housing 109 is formed with a slit-like discharge outlet 109A in communication with the cassette accommodation portion 101. The printing tape 11A in the printing cassette 10 accommodated in the cassette accommodation portion 101 is configured to be discharged out of the housing 109 through the discharge outlet 109A.

Print Head

The print head 102 is disposed inside the cassette accommodation portion 101. The print head 102 includes a plurality of heating elements which are configured to be heated individually by a controller (not shown).

Platen Roller and Platen Gear

The platen roller 103 is disposed inside the cassette accommodation portion 101 near the print head 102 so as to oppose the print head 102. The platen roller 103 is pivotably movable toward and away from the print head 102. The platen roller 103 defines a rotational axis L1 in parallel to the up-down direction.

The platen gear 104 is coupled with the platen roller 103. The platen gear 104 is engageable with an output gear 21 of the printing cassette 10, as will be described later. The platen gear 104 defines a rotational axis L2 which is coincident with the rotational axis L1 of the platen roller 103. The platen gear 104 is pivotable together with the platen roller 103. Into the platen roller 103, a drive force of the drive shaft 106 is configured to be inputted through the printing cassette 10 and the platen gear 104.

Roller Holder

The roller holder 105 holds the platen roller 103 and the platen gear 104. The roller holder 105 is mounted in the housing 109 such that the roller holder 105 is pivotable in the front-rear direction relative to the housing 109.

Drive Shaft

The drive shaft 106 is inserted into a take-up spool 16 and an input gear 22 in the printing cassette 10. The drive shaft 106 is configured to input the drive force into the printing cassette 10 for rotating the take-up spool 16 and the input gear 22.

The drive shaft 106 is disposed inside the cassette accommodation portion 101. The drive shaft 106 defines a rotational axis L3 aligned in the up-down direction. The drive shaft 106 is rotatable about the rotational axis L3 by the motor 110 and the first drive transmission portion 120.

Cutter

The cutter 107 illustrated in FIGS. 2A and 2B is configured to cut the printing tape 11A to be discharged through the discharge outlet 109A.

The cutter 107 is held inside the housing 109 such that the cutter 107 is pivotable in the front-rear direction. The cutter 107 is configured to pivot rearward to cut the printing tape 11A in a thickness direction thereof. The cutter 107 is configured to pivotally move when driven by the motor 110 and the second drive transmission portion 130.

Motor

The motor 110 is a drive source for driving the platen roller 103 and the cutter 107. The motor 110 includes a motor body 111, a motor output shaft 112, and a motor gear 113.

The motor body 111 is configured to generate the drive force using electric power. The motor output shaft 112 is configured to rotate by rotation of the motor body 111. The motor output shaft 112 defines a rotational axis that is parallel to the rotational axis L3 of the drive shaft 106 (i.e., aligned in the up-down direction). The motor gear 113 is coupled to the motor output shaft 112 and is rotatable together with the motor output shaft 112.

At least a portion of the motor 110 is aligned with (overlaps) the cassette accommodation portion 101 in the up-down direction. In the present embodiment, the motor 110 is arranged at such a position that an entirety of the motor 110 overlaps the cassette accommodation portion 101 from below. That is, the motor 110 in its entirety overlaps the printing cassette 10 accommodated in the cassette accommodation portion 101 in the up-down direction.

The motor body 111 has at least a portion that is at the same position (at the same height) as the second drive transmission portion 130 in the up-down direction. That is, the motor body 111 overlaps the second drive transmission portion 130 in a direction orthogonal to the up-down direction (i.e., in a radial direction of the motor body 111 or in the front-rear direction in the embodiment).

The motor output shaft 112 is arranged closer to the insertion opening 101A of the cassette accommodation portion 101 than the motor body 111 is to the insertion opening 101A in the up-down direction. That is, the motor output shaft 112 is disposed above the motor body 111.

Further, at least a part of the motor output shaft 112 and at least a part of the motor gear 113 are arranged at the same position (at the same height) as the first drive transmission portion 120 in the up-down direction. In other words, the motor output shaft 112 and the motor gear 113 overlap the first drive transmission portion 120 in a direction orthogonal to the up-down direction (i.e., in the left-right direction in the embodiment).

First Drive Transmission Portion

The first drive transmission portion 120 is configured to transmit the drive force of the motor 110 to the platen roller 103 in a state where the printing cassette 10 is mounted in the cassette accommodation portion 101.

Specifically, the first drive transmission portion 120 is configured to transmit the drive force of the motor 110 to the drive shaft 106. As described above, the drive force transmitted to the drive shaft 106 is then configured to be conveyed to the platen roller 103 via the printing cassette 10 and the platen gear 104.

The first drive transmission portion 120 includes a first gear 121, and a second gear 122. The first gear 121 is positioned to mesh with a planetary gear 142 (described later) of the drive switching portion 140. The drive force of the motor 110 is configured to be inputted into the first gear 121 via the drive switching portion 140. The first gear 121 defines a rotational axis aligned in the up-down direction.

The second gear 122 is coupled with the drive shaft 106 and meshes with the first gear 121. The second gear 122 defines a rotational axis coincident with the rotational axis L3 of the drive shaft 106. The second gear 122 is configured to rotate the drive shaft 106 by the drive force transmitted from the first gear 121.

Each gear included in the first drive transmission portion 120 (i.e., the first gear 121 and the second gear 122) overlaps, at least partially, the cassette accommodation portion 101 in the up-down direction. In the present embodiment, an entirety of the first gear 121 and an entirety of the second gear 122 are positioned to overlap with the cassette accommodation portion 101 from below.

The first drive transmission portion 120 overlaps a portion of the second drive transmission portion 130 in the up-down direction. The first drive transmission portion 120 is positioned above a fourth gear 132 and a fifth gear 133 (described later) of the second drive transmission portion 130.

Second Drive Transmission Portion

The second drive transmission portion 130 is configured to transmit the drive force of the motor 110 to the cutter 107. Specifically, the second drive transmission portion 130 is configured to transmit the drive force of the motor 110 to the cutter driving cam 160.

The second drive transmission portion 130 includes a third gear 131, the fourth gear 132, and the fifth gear 133. The third gear 131 is positioned to mesh with the planetary gear 142 of the drive switching portion 140. The drive force of the motor 110 is configured to be inputted into the third gear 131 via the drive switching portion 140.

The third gear 131 includes an upstream gear 131A, a downstream gear 131B, and a connecting part 131C. The upstream gear 131A is arranged at the same position (at the same height) as the planetary gear 142 in the up-down direction. The upstream gear 131A defines a rotational axis aligned in the up-down direction.

The downstream gear 131B is positioned below the upstream gear 131A. The downstream gear 131B defines a rotational axis coincident with the rotational axis of the upstream gear 131A. The connecting part 131C connects the upstream gear 131A to the downstream gear 131B in the up-down direction. Accordingly, the drive force inputted into the upstream gear 131A is configured to be outputted from the downstream gear 131B.

The connecting part 131C extends in the up-down direction through an opening 150A formed in the frame 150. That is, the third gear 131 is a rotatable body that penetrates through the frame 150 in the up-down direction and that is configured to transmit the drive force in the up-down direction (downward).

The fourth gear 132 is in mesh with the downstream gear 131B of the third gear 131. The fifth gear 133 is in mesh with the fourth gear 132. Each of the fourth gear 132 and the fifth gear 133 defines a rotational axis aligned in the up-down direction.

Figure 3:
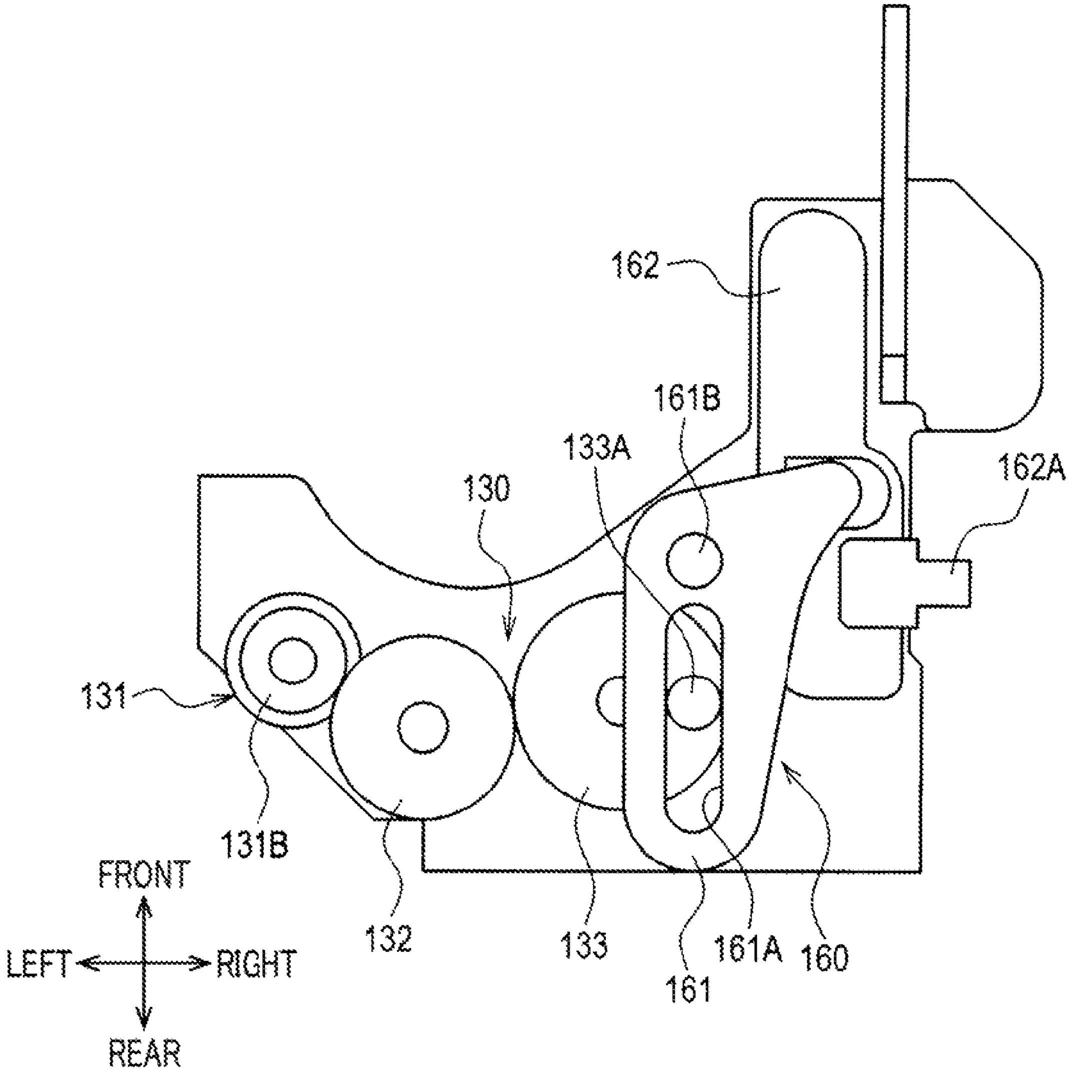
FIG. 3 is a schematic plan view of a second drive transmission portion and a cutter driving cam in the device body of FIG. 1B.

As illustrated in FIG. 3, the fifth gear 133 is coupled with a first cam 161 of the cutter driving cam 160. Specifically, the fifth gear 133 has a protrusion 133A that is inserted in a slit 161A formed in the first cam 161.

Each gear included in the second drive transmission portion 130 (i.e., the third gear 131, the fourth gear 132, and the fifth gear 133) overlaps, at least partially, the cassette accommodation portion 101 in the up-down direction. In the present embodiment, an entirety of the third gear 131, an entirety of the fourth gear 132, and an entirety of the fifth gear 133 are respectively positioned to overlap the cassette accommodation portion 101 from below.

At least a portion of the second drive transmission portion 130 is arranged at a different position from the first drive transmission portion 120 with respect to the up-down direction. Specifically, in the present embodiment, the downstream gear 131B of the third gear 131, the fourth gear 132, and the fifth gear 133 are disposed below the first drive transmission portion 120. However, the upstream gear 131A of the third gear 131 is disposed at the same position (at the same height) as the first drive transmission portion 120 in the up-down direction.

Drive Switching Portion

Figure 4A:
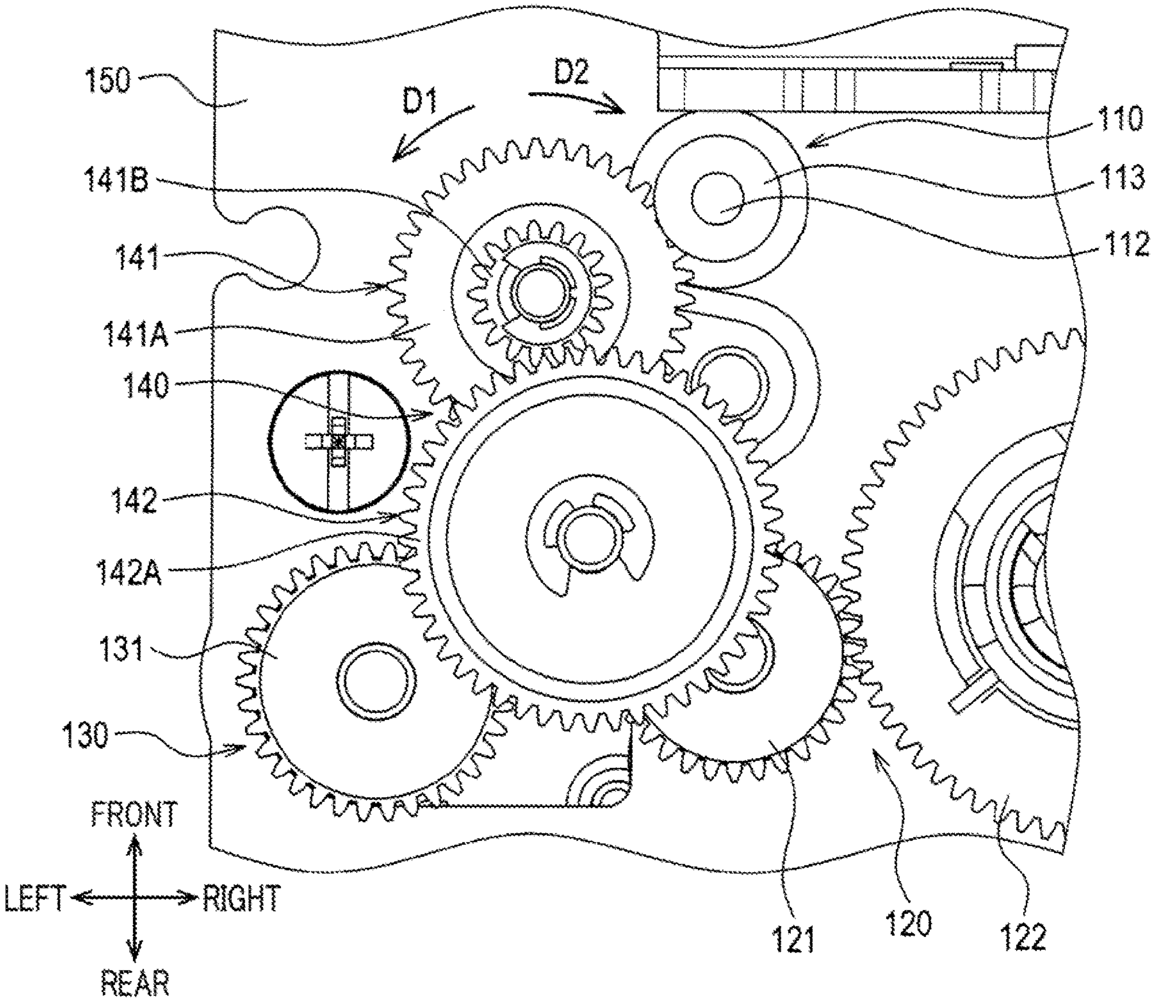
FIG. 4A is a schematic plan view of a drive switching portion in the device body of FIG. 1B.
Figure 4B:
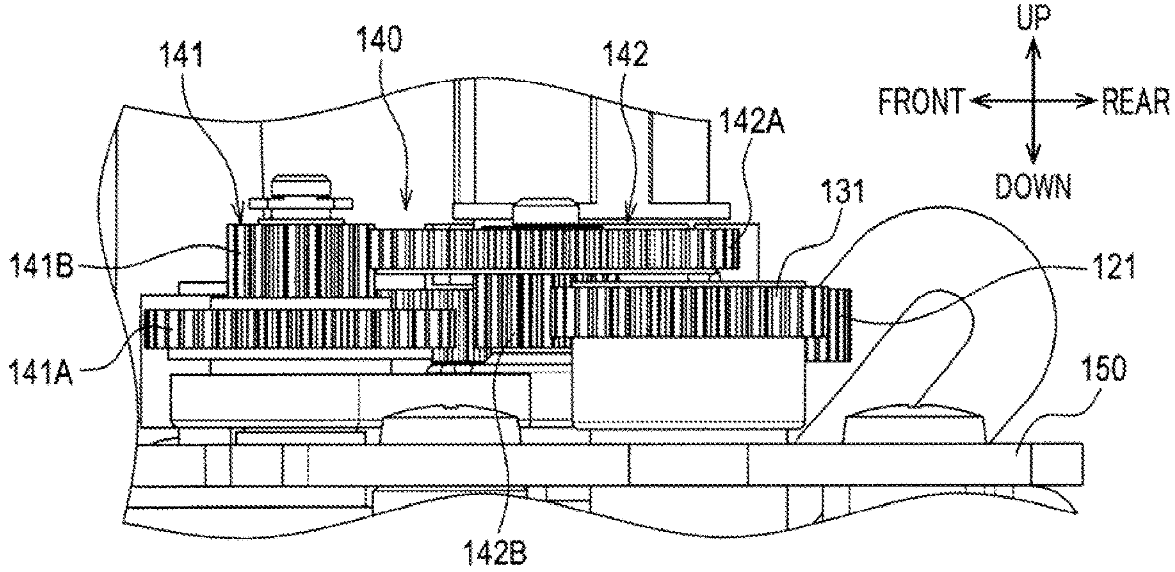
FIG. 4B is a schematic side view of the drive switching portion of FIG. 4A.

The drive switching portion 140 illustrated in FIGS. 4A and 4B is configured to transmit the drive force of the motor 110 selectively to the first drive transmission portion 120 or to the second drive transmission portion 130.

The drive switching portion 140 includes a sun gear 141, and the planetary gear 142. The sun gear 141 is configured to receive the drive force from the motor 110. Specifically, the sun gear 141 is a stepped gear configured of an upstream gear 141A and a downstream gear 141B coaxial with each other.

The upstream gear 141A of the sun gear 141 meshes with the motor gear 113 of the motor 110 (gear teeth of the motor gear 113 are not illustrated in FIG. 4A). The downstream gear 141B of the sun gear 141 is provided above the upstream gear 141A and meshes with the planetary gear 142.

The planetary gear 142 is in mesh with the sun gear 141 (downstream gear 141B), and is also pivotable about the rotational axis of the sun gear 141 while rotating. The planetary gear 142 is a stepped gear configured of an upstream gear 142A and a downstream gear 142B coaxial with each other.

The upstream gear 142A of the planetary gear 142 meshes with the downstream gear 141B of the sun gear 141. The downstream gear 142B of the planetary gear 142 is configured to mesh with either the first gear 121 of the first drive transmission portion 120, or the third gear 131 of the second drive transmission portion 130.

As the sun gear 141 rotates, the planetary gear 142 pivots in the left-right direction about the rotational axis of the sun gear 141. Specifically, in accordance with rotation of the sun gear 141 in a first rotating direction D1 (i.e., forward rotation), the planetary gear 142 pivots rightward to come into meshing engagement with the first gear 121. As a result, the drive force of the motor 110 is transmitted only to the first drive transmission portion 120.

On the other hand, when the motor 110 rotates in a second rotating direction D2 opposite the first rotating direction D1 (i.e., reverse rotation), the planetary gear 142 pivots leftward to come into meshing engagement with the third gear 131. As a result, the drive force of the motor 110 is transmitted only to the second drive transmission portion 130.

As illustrated in FIG. 2A, the drive switching portion 140 is positioned closer to the insertion opening 101A of the cassette accommodation portion 101 than at least a part of the second drive transmission portion 130 is to the insertion opening 101A in the up-down direction. Specifically, the sun gear 141 and the planetary gear 142 are positioned above the fourth gear 132 and the fifth gear 133 of the second drive transmission portion 130.

Variation of the Drive Switching Portion

Figure 5:
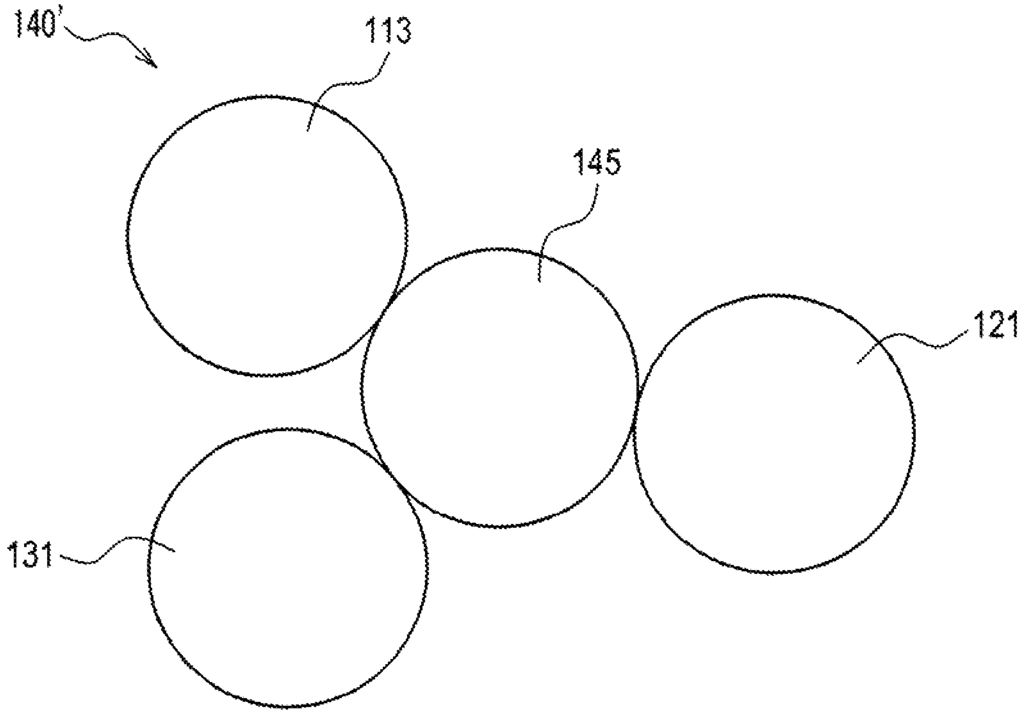
FIG. 5 is a schematic plan view illustrating a drive switching portion according a modification to the embodiment.

FIG. 5 illustrates an alternative structure to the drive switching portion 140 of the embodiment. Specifically, a drive switching portion 140' according to this variation includes a one-way clutch 145, instead of the sun gear 141 and the planetary gear 142 of the embodiment.

Figure 6A:
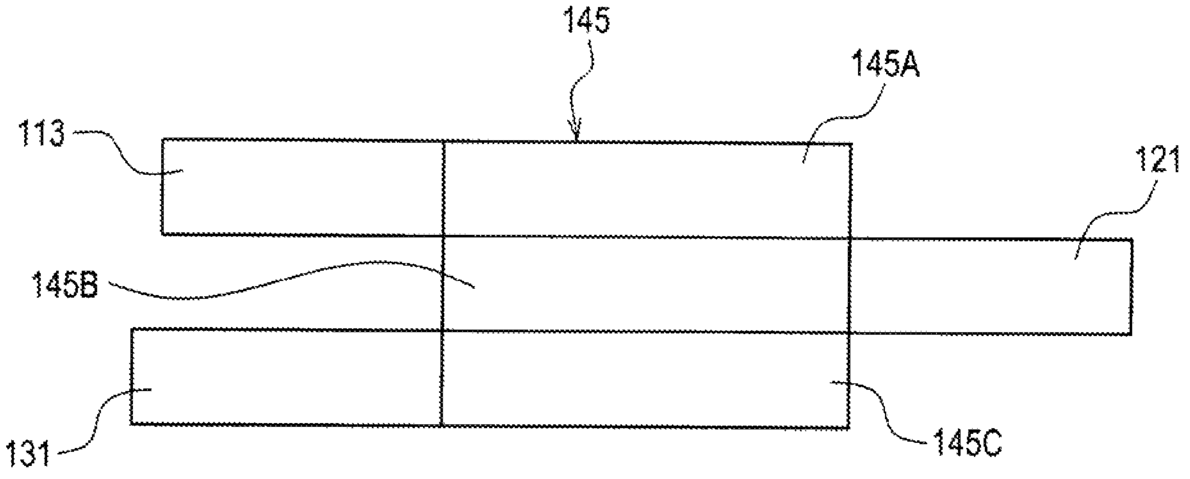
FIG. 6A is a schematic side view of the drive switching portion of FIG. 5.

The one-way clutch 145 is configured to transmit the drive force of the motor 110 (i.e., the motor gear 113) to either one of the first gear 121 and the third gear 131. Specifically, as illustrated in FIG. 6A, the one-way clutch 145 includes a first rotatable body 145A, a second rotatable body 145B, and a third rotatable body 145C.

The first rotatable body 145A is a part into which the drive force of the motor 110 is configured to be inputted. Each of the second rotatable body 145B and the third rotatable body 145C is coaxial with the first rotatable body 145A and is configured to output the drive force of the motor 110 transmitted from the first rotatable body 145A.

The first rotatable body 145A has, for example, a shaft part that is received in a center hole region (i.e., serving as a bearing) of each of the second rotatable body 145B and the third rotatable body 145C. The shaft part of the first rotatable body 145A is thus connected to the second rotatable body 145B and the third rotatable body 145C.

The second rotatable body 145B is configured to transmit the drive force from the first rotatable body 145A to the first drive transmission portion 120, through the bearing of the second rotatable body 145B in which the shaft part of the first rotatable body 145A is inserted, when the first rotatable body 145A rotates in a first rotating direction (i.e., during forward rotation).

The third rotatable body 145C is configured to transmit the drive force from the first rotatable body 145A to the second drive transmission portion 130, through the bearing of the third rotatable body 145C in which the shaft part of the first rotatable body 145A is inserted, when the first rotatable body 145A rotates in a second rotating direction (i.e., during reverse rotation).

With this configuration, the first rotatable body 145A is configured to transmit the drive force only to the second rotatable body 145B while making forward rotation. That is, the third rotatable body 145C does not rotate during the forward rotation of the first rotatable body 145A. On the other hand, the first rotatable body 145A is configured to transmit the drive force only to the third rotatable body 145C while making reverse rotation. That is, the second rotatable body 145B does not rotate during the reverse rotation of the first rotatable body 145A.

Figure 6B:
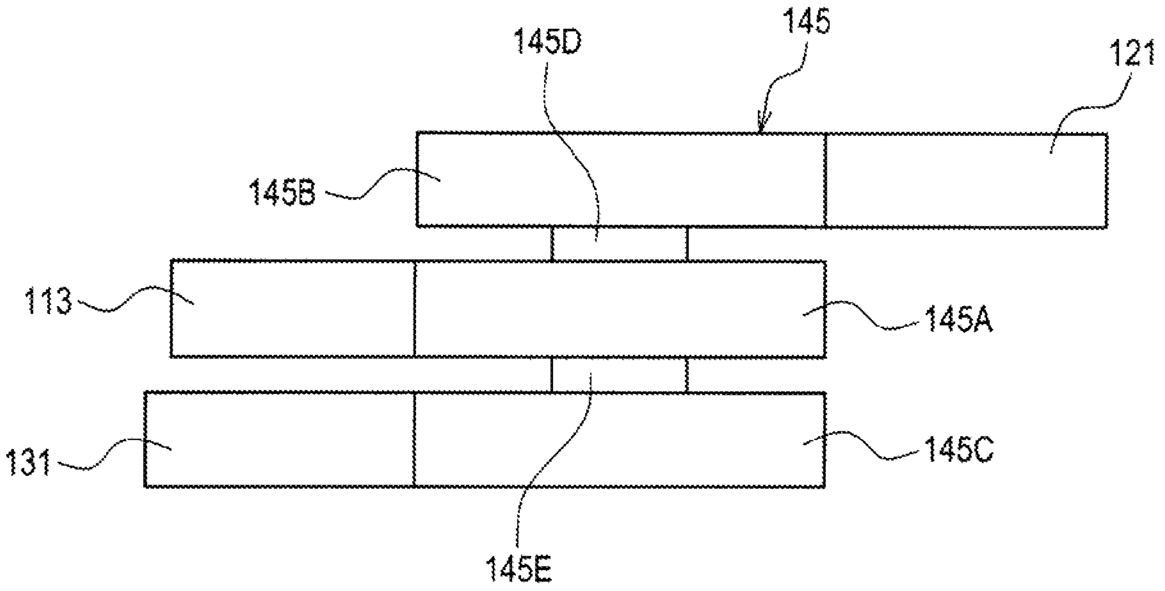
FIG. 6B is a schematic side view of a modification to the drive switching portion of FIG. 5.

Incidentally, the one-way clutch 145 may further include a first clutch spring 145D and a second clutch spring 145E, as illustrated in FIG. 6B. The first clutch spring 145D connects the first rotatable body 145A to the second rotatable body 145B. The second clutch spring 145E connects the first rotatable body 145A to the third rotatable body 145C.

In this variation, for connecting the first rotatable body 145A to each of the second rotatable body 145B and the third rotatable body 145C, the first and second clutch springs 145D, 145E may be provided such that the second rotatable body 145B and the third rotatable body 145C are arranged opposite each other with respect to the rotatable body 145A in a direction parallel to the rotational axis of the first rotatable body 145A.

The first rotatable body 145A, the second rotatable body 145B, and the third rotatable body 145C may be configured of gears or rollers, provided that these rotatable bodies 145A-145C can transmit the drive force by rotations thereof.

Incidentally, the one-way clutch 145 may further have a function as a reduction mechanism. In order to enable the one-way clutch 145 to function as a reduction mechanism, each of the first rotatable body 145A, the second rotatable body 145B, and the third rotatable body 145C may be configured as a gear; and the number of gear teeth of the first rotatable body 145A may be made different from the number of gear teeth of the second rotatable body 145B, or the number of gear teeth of the third rotatable body 145C, or both.

Frame

The frame 150 illustrated in FIG. 2A is a plate-shaped member having flat surfaces crossing (precisely, orthogonal to) the up-down direction. The frame 150 is arranged beneath a bottom surface of the cassette accommodation portion 101.

An entirety of the first drive transmission portion 120 and an entirety of the drive switching portion 140 are arranged above the frame 150 to overlap with the top surface of the frame 150. The fourth gear 132 and the fifth gear 133 of the second drive transmission portion 130 are arranged below the frame 150 to overlap with the bottom surface of the frame 150. The third gear 131 of the second drive transmission portion 130 and the motor output shaft 112 of the motor 110 respectively penetrate through the frame 150 in the up-down direction.

Cutter Driving Cam

The cutter driving cam 160 illustrated in FIG. 3 is configured to transmit the drive force from the second drive transmission portion 130 to the cutter 107.

The cutter driving cam 160 includes the first cam 161 and a second cam 162. The first cam 161 has the slit 161A within which the protrusion 133A of the fifth gear 133 of the second drive transmission portion 130 is movable. The first cam 161 is pivotable about an axis of a shaft part 161B in accordance with the rotation of the fifth gear 133.

The second cam 162 is connected to the first cam 161. In accordance with the pivotal movement of the first cam 161, the second cam 162 is movable to move a pin 162A thereof in the front-rear direction. As illustrated in FIG. 2B, the pin 162A is inserted in a slit formed in the cutter 107. With this structure, the cutter 107 is pivotable forward and rearward in accordance with the movement of the pin 162A in the front-rear direction.

<Printing Cassette>

The printing cassette 10 houses the printing tape 11A therein. The printing cassette 10 is attachable to and detachable from the device body 100. By replacing the printing cassette 10 with a new one, the printing tape 11A can be replenished and/or the type of the printing tape 11A (such as the size, color, material, and the like) can be changed.

Figure 7A:
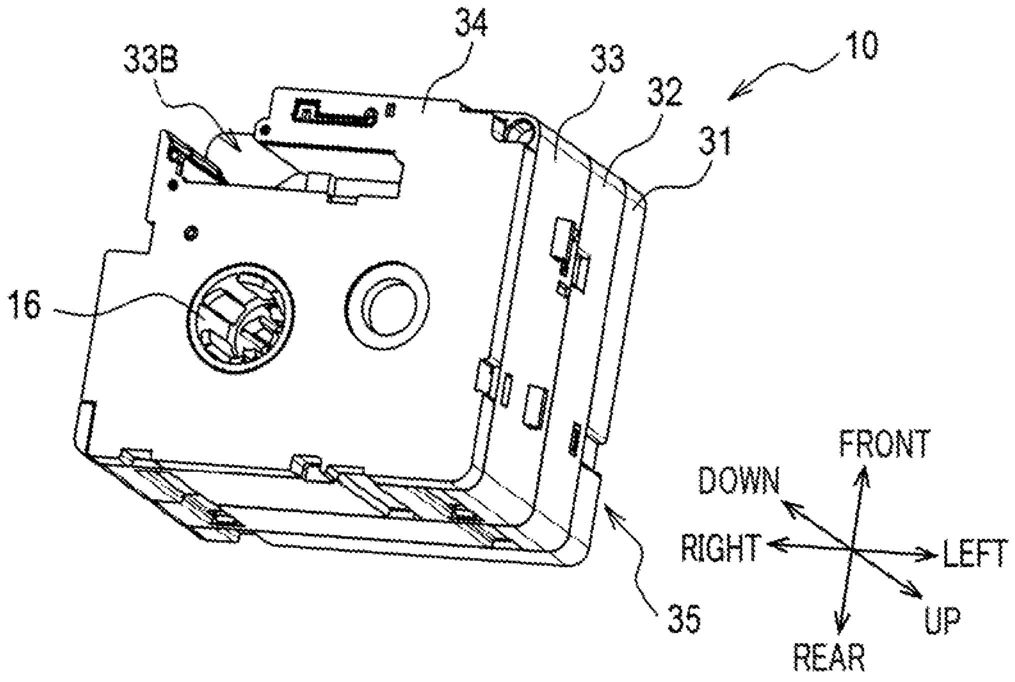
FIG. 7A is a schematic perspective view of a printing cassette for the printing device of FIG. 1A.
Figure 7B:
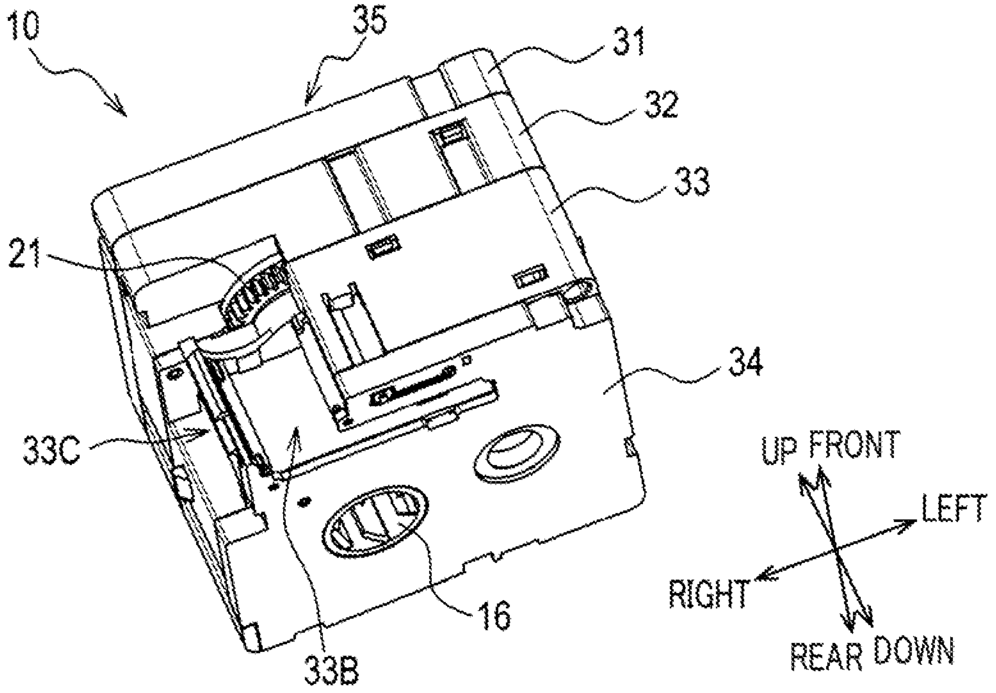
FIG. 7B is another schematic perspective view of the printing cassette for the printing device of FIG. 1A.

As illustrated in FIGS. 7A and 7B, the printing cassette 10 includes a case 35 that houses at least a portion of the printing tape 11A and at least a portion of an ink ribbon 14A (as an auxiliary tape).

The printing cassette 10 (i.e., the case 35) has a rectangular parallelepiped shape with parallel sides aligned in the up-down direction, parallel sides aligned in the front-rear direction, and parallel sides aligned in the left-right direction. The case 35 (printing cassette 10) can be inserted downward into the cassette accommodation portion 101.

Figure 8:
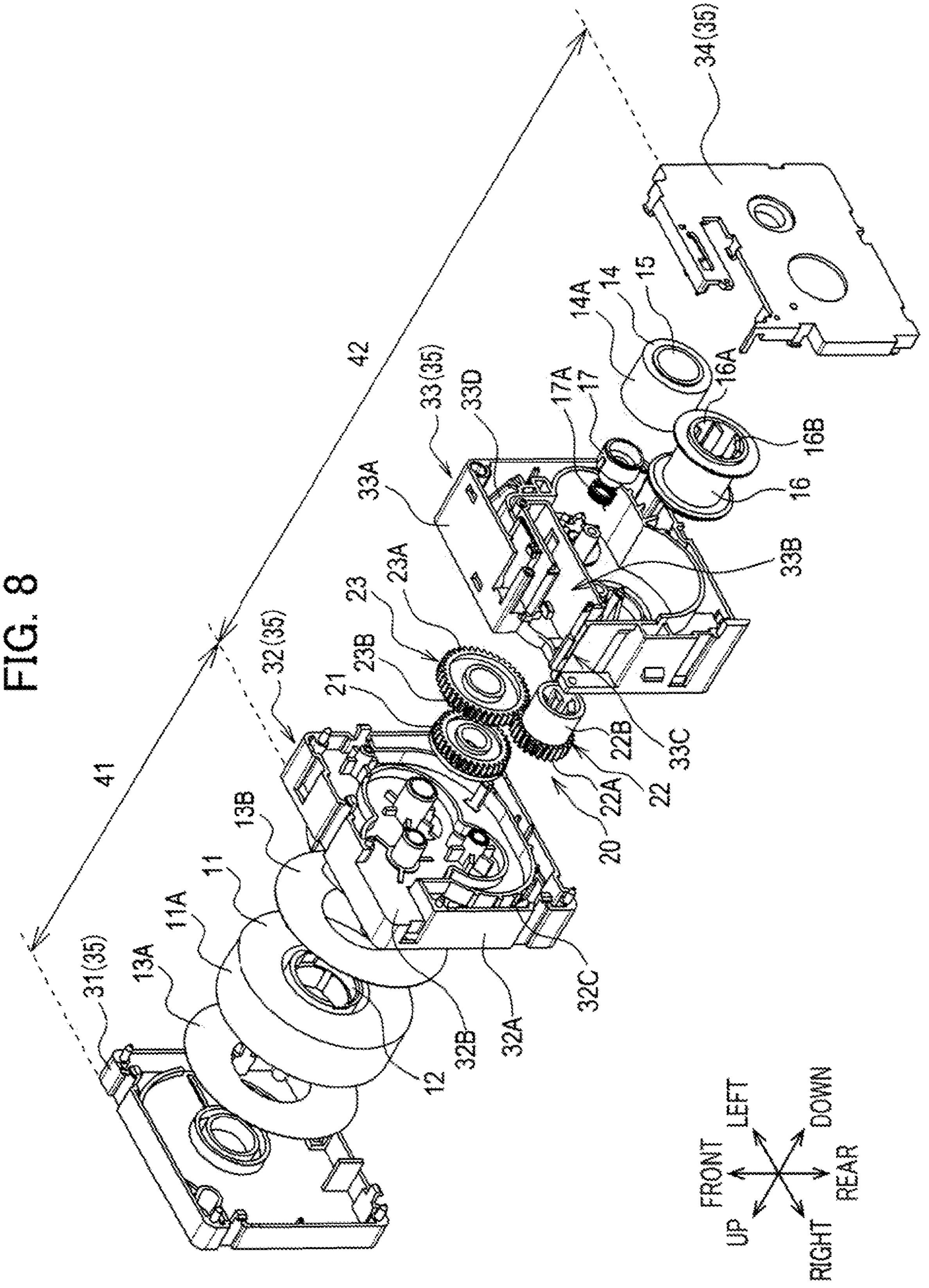
FIG. 8 is an exploded perspective view of the printing cassette of FIG. 7A.

As illustrated in FIG. 8, the printing cassette 10 includes a printing tape roll 11, a first supply spool 12, an auxiliary tape roll 14, a second supply spool 15, the take-up spool 16, a clutch spring holder 17, and a drive transmission mechanism 20.

Printing Tape Roll

The printing tape roll 11 is configured of the strip-like printing tape 11A wound around the first supply spool 12. The printing tape 11A is subjected to printing. Specifically, printing is performed on a front surface of the printing tape 11A by the print head 102 of the device body 100 using the ink ribbon 14A.

Two spacer films 13A and 13B are disposed on respective outer sides of the printing tape roll 11 in the up-down direction to sandwich the printing tape roll 11 therebetween. The spacer film 13A is interposed between the printing tape roll 11 and a first cover part 31 (described later) of the case 35. The spacer film 13B is interposed between the printing tape roll 11 and a first frame part 32 (described later) of the case 35.

First Supply Spool

The first supply spool 12 is rotatable about a rotational axis aligned in the up-down direction. The first supply spool 12 is rotatable following conveyance of the printing tape 11A by the platen roller 103 of the device body 100, thereby supplying the printing tape printing tape 11A to the print head 102. The rotational axis of the first supply spool 12 is coincident with a winding axis (rotational axis) of the printing tape roll 11.

Auxiliary Tape Roll

The auxiliary tape roll 14 is configured of the strip-like ink ribbon 14A wound around the second supply spool 15. The ink ribbon 14A is used for printing the printing tape 11A.

The ink ribbon 14A is configured to be overlaid on the printing tape 11A within a head opening 33B (described later) where printing is performed on the printing tape 11A through the ink ribbon 14A by the print head 102. After being used for printing, the ink ribbon 14A is configured to be taken up over the take-up spool 16.

With respect to the up-down direction, the auxiliary tape roll 14 is at a position different from the printing tape roll 11. Specifically, the auxiliary tape roll 14 is positioned below the printing tape roll 11. Further, at least a portion of the auxiliary tape roll 14 is arranged to overlap with (aligned with) the printing tape roll 11 in the up-down direction.

Second Supply Spool

The second supply spool 15 is rotatable about a rotational axis thereof aligned in the up-down direction.

The second supply spool 15 is rotatable flowing movement of the ink ribbon 14A taken up by the take-up spool 16, thereby supplying the ink ribbon 14A to the print head 102. The second supply spool 15 is applied with rotational resistance by a clutch spring 17A held in the clutch spring holder 17.

Take-Up Spool

The take-up spool 16 is rotatable about a rotational axis parallel to the rotational axis of the second supply spool 15.

The take-up spool 16 is cylindrical, and has an inner circumferential surface 16A defining a hollow space in the cylindrical take-up spool 16. Splines 16B are formed on the inner circumferential surface 16A of the take-up spool 16. The drive shaft 106 of the device body 100 is configured to be engaged with the splines 16B. The take-up spool 16 is configured to be rotated by the drive shaft 106 to take up the ink ribbon 14A that was used for printing.

Drive Transmission Mechanism

The drive transmission mechanism 20 is configured to transmit the drive force received from the drive shaft 106 to the platen roller 103 when the printing cassette 10 has been attached to the device body 100. The drive transmission mechanism 20 includes the output gear 21, the input gear 22, and an idle gear 23.

The printing tape roll 11, the drive transmission mechanism 20, and the take-up spool 16 are arranged in order mentioned from top with respect to the up-down direction.

Output Gear

The output gear 21 is an external gear for externally outputting the drive force to be used for conveying the printing tape 11A. Specifically, the output gear 21 is configured to transmit the drive force to the platen gear 104 of the device body 100.

The output gear 21 is rotatable about the rotational axis which is parallel to the rotational axis of the second supply spool 15. A part of the output gear 21 is exposed to a space in communication with the head opening 33B (see FIG. 7B). The output gear 21 can engage the platen gear 104 in the space communicating with the head opening 33B in a state where the printing cassette 10 is mounted in the device body 100 (i.e., in a state where the case 35 is accommodated in the cassette accommodation portion 101).

Input Gear

The input gear 22 is indirectly engaged with the output gear 21 via the idle gear 23. The input gear 22 is thus configured to transmit the drive force to the output gear 21.

The input gear 22 has an external gear 22A, and a spool 22B. The spool 22B is a cylindrical internal gear, and has an inner circumferential surface formed with splines. The spool 22B is fixed to one side surface of the external gear 22A. The external gear 22A is thus rotatable together with the spool 22B by the drive force inputted into the spool 22B. The input gear 22 defines a rotational axis (which is coincident with rotational axes of the external gear 22A and the spool 22B) which is aligned with (i.e., positioned on an extension line of) the rotational axis of the take-up spool 16.

The rotational axis of the input gear 22 is aligned with the hollow space of the take-up spool 16 in the up-down direction. Accordingly, the drive shaft 106 can be inserted simultaneously into the take-up spool 16 and the input gear 22 when the printing cassette 10 is mounted in the device body 100. As a result, the input gear 22 is cause to rotate together with the take-up spool 16 by the drive shaft 106, although the input gear 22 is not directly coupled to the take-up spool 16.

Idle Gear

The idle gear 23 is drivingly connected to (meshes with) the input gear 22 and the output gear 21 for transmitting the drive force inputted into the input gear 22 to the output gear 21.

The idle gear 23 is a stepped gear configured of an upstream gear 23A and a downstream gear 23B coaxially arranged with each other. The upstream gear 23A meshes with the input gear 22, and the downstream gear 23B meshes with the output gear 21. The downstream gear 23B has a diameter smaller than a diameter of the upstream gear 23A. Further, the downstream gear 23B is positioned closer to the printing tape roll 11 than the upstream gear 23A is to the printing tape roll 11 in the up-down direction. That is, the downstream gear 23B is positioned above the upstream gear 23A.

The idle gear 23 is configured to transmit the drive force inputted into the input gear 22 to the output gear 21 while reducing the rotational speed of the drive force. That is, the drive transmission mechanism 20 includes a reduction mechanism according to which a transmission ratio obtained by dividing the rotational speed of the input gear 22 by the rotational speed of the output gear 21 can be set as a reduction ratio.

Case

The case 35 includes the first cover part 31, the first frame part 32, a second frame part 33, and a second cover part 34.

The first cover part 31 constitutes a top portion of the printing cassette 10. The first frame part 32 is provided below the first cover part 31 and is coupled to the first cover part 31 in the up-down direction. The second frame part 33 is provided below the first frame part 32 and is coupled to the first frame part 32 in the up-down direction. The second cover part 34 constitutes a bottom portion of the printing cassette 10. The second cover part 34 is coupled to the second frame part 33 in the up-down direction.

The first cover part 31 and the first frame part 32 constitute a first case compartment 41 that accommodates the printing tape roll 11 therein. In other words, the printing tape roll 11 is accommodated in a space enclosed by the first cover part 31 and the first frame part 32.

The first frame part 32, the second frame part 33, and the second cover part 34 constitute a second case compartment 42 that accommodates the drive transmission mechanism 20, the auxiliary tape roll 14, the second supply spool 15, and the take-up spool 16.

Specifically, the drive transmission mechanism 20 is disposed in a space enclosed by the first frame part 32 and the second frame part 33. The auxiliary tape roll 14, the second supply spool 15, and the take-up spool 16 are disposed in a space enclosed by the second cover part 34 and the second frame part 33.

The first frame part 32 has a first side wall 32A, a partitioning wall 32B, and a first guide 32C. The first side wall 32A constitutes an outer side surface of the case 35 that extends in the up-down direction. The partitioning wall 32B extends in the front-rear direction and in the left-right direction to have a surface perpendicular to the up-down direction. The partitioning wall 32B is aligned with (overlaps) the printing tape roll 11 and the drive transmission mechanism 20 in the up-down direction.

The first guide 32C is a portion around which the printing tape 11A paid off the printing tape roll 11 is configured to be wrapped. The first guide 32C has a plurality of plate-like ribs arranged to be spaced apart from one another in a circumferential direction of the printing tape roll 11. The ribs protrude outward in radial directions of the printing tape roll 11 such that a protruding amount (i.e., height) of each rib increases toward the bottom thereof.

The second frame part 33 has a second side wall 33A, the head opening 33B, an outlet 33C, and a second guide 33D.

The second side wall 33A constitutes an outer side surface of the case 35 that extends in the up-down direction. The head opening 33B is a notch provided by cutting out a portion of the second side wall 33A. The head opening 33B is a space where the print head 102 is located in the state where the printing cassette 10 is mounted in the device body 100.

Printing is performed on the printing tape 11A in the head opening 33B by the print head 102. The head opening 33B is open downward to the bottom of the printing cassette 10 so that the print head 102 can be inserted in the head opening 33B from below.

Figure 9:
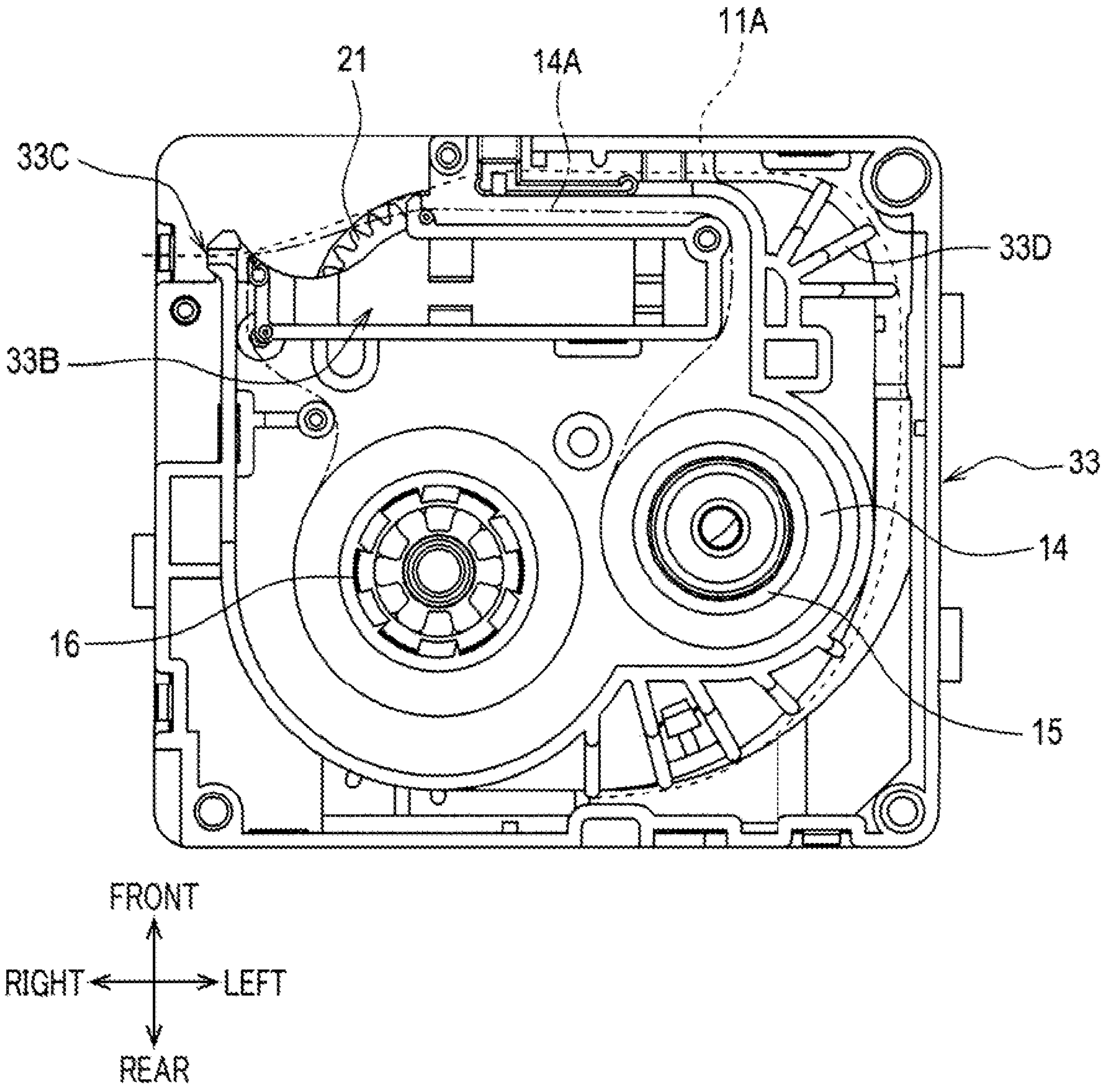
FIG. 9 is a schematic plan view illustrating conveying paths for a printing tape and an ink ribbon in the printing cassette of FIG. 7A.

As illustrated in FIG. 9, the printing tape 11A and the ink ribbon 14A extend in the left-right direction through the head opening 33B. In the head opening 33B, the printing tape 11A is exposed to the outside of the case 35 and is overlaid on the ink ribbon 14A. After printing is performed on the printing tape 11A, the printing tape 11A is configured to be discharged, through the outlet 33C, to the outside of the printing device 1 (device body 100).

The second guide 33D is a portion of the second frame part 33 around which the printing tape 11A paid off the printing tape roll 11 is configured to be wrapped, just like the first guide 32C. The second guide 33D has a plurality of plate-like ribs arranged to be spaced apart from one another in ae circumferential direction of the auxiliary tape roll 14. The ribs protrude outward in radial directions of the auxiliary tape roll 14. The protruding amount (i.e., height) of each rib decreases toward the bottom thereof.

Conveyance and Printing of Tape with the Device Body

In the state where the printing cassette 10 is mounted in the device body 100, the print head 102 is at a position in the head opening 33B overlapping the printing tape 11A and the ink ribbon 14A in the front-rear direction.

The printing tape 11A is conveyed by the platen roller 103 into the head opening 33B where the printing tape 11A is pressed against the print head 102 by the platen roller 103 so as to be heated by the heating elements of the print head 102 through the ink ribbon 14A. As a result, some of the ink provided on the surface of the ink ribbon 14A is transferred onto the printing tape 11A, by which characters, symbols, and the like are formed (printed) on the printing tape 11A.

Figure 10:
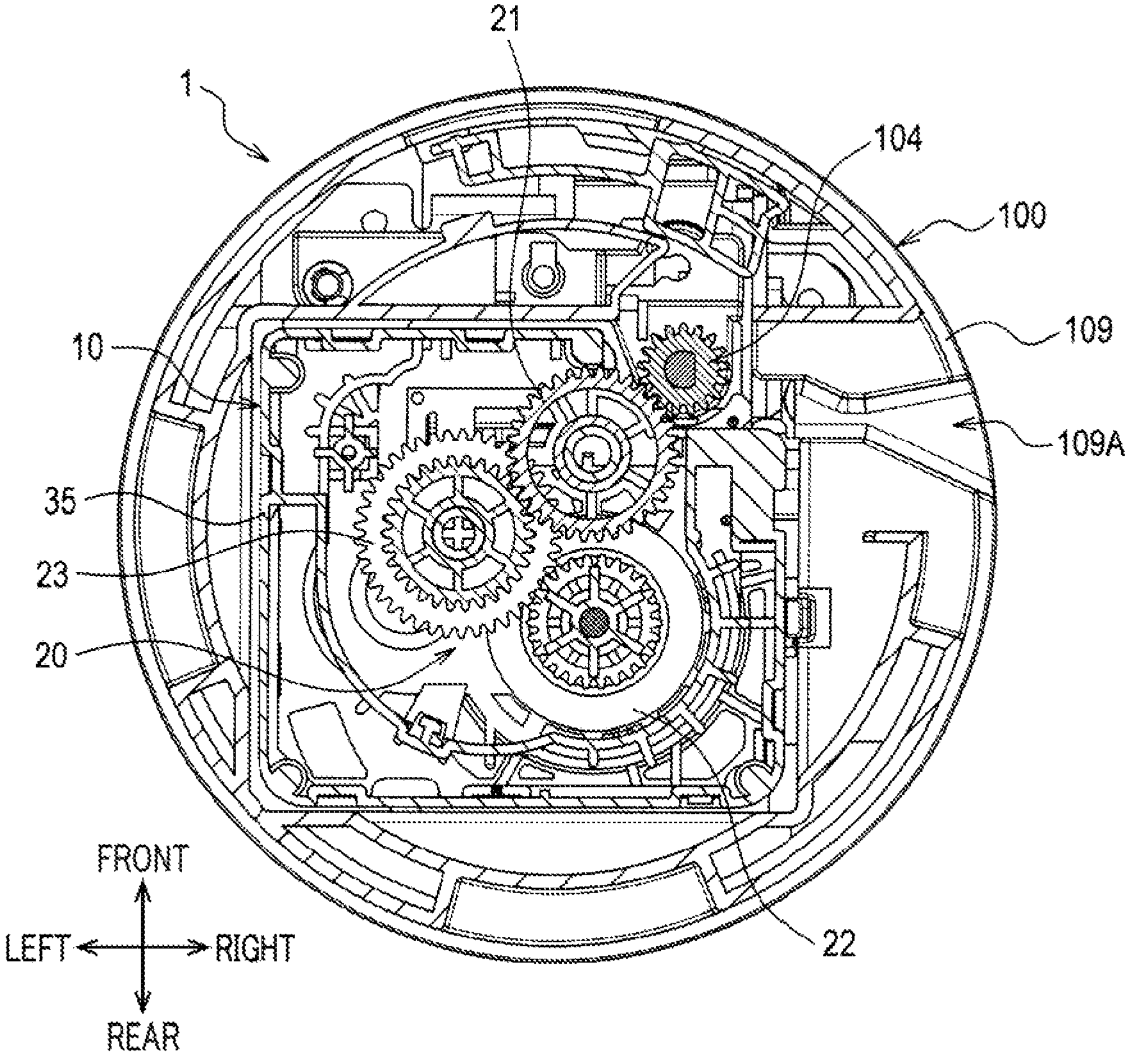
FIG. 10 is a schematic plan view illustrating a state of engagement between an output gear and a platen gear in the printing device of FIG. 1A.

The platen roller 103 continues to convey the printed printing tape 11A toward the outside of the printing cassette 10 through the outlet 33C. The platen roller 103 is rotated by the platen gear 104 that is meshingly engaged with the output gear 21. The platen roller 103 is pivotable, through the movement of the roller holder 105, between a remote position separated from the printing cassette 10 (not illustrated) and a pressing position where the platen gear 104 is meshingly engaged with the output gear 21 (illustrated in FIG. 10).

In the state where the case 35 of the printing cassette 10 is inserted in the cassette accommodation portion 101, the drive shaft 106 is engaged with the input gear 22 and the platen gear 104 meshes with the output gear 21.

Specifically, when the platen roller 103 pivots toward the head opening 33B in the state where the drive shaft 106 is inserted in the take-up spool 16 and input gear 22, the platen gear 104 comes into meshing engagement with the output gear 21.

The output gear 21 is rotated when the drive shaft 106 rotates the input gear 22 in the state where the printing cassette 10 is attached to the cassette accommodation portion 101. The platen gear 104 is rotated by the rotation of the output gear 21, and the platen roller 103 is then rotated in accordance with the rotation of the platen gear 104.

2. Technical Advantageous of the Embodiment

The embodiment described above can achieve the following technical advantages.

(1a) At least a portion of the motor 110 overlaps the cassette accommodation portion 101 (i.e., the printing cassette 10) in the up-down direction. With this structure, the platen roller 103 and the cutter 107 can be driven by the single motor 110 without an increase in the size of the printing device 1.

(1b) At least a part of gears in each of the first drive transmission portion 120 and the second drive transmission portion 130 overlaps the cassette accommodation portion 101 in the up-down direction. This structure can further promote a reduction in the size of the printing device 1.

(1c) At least a part of the second drive transmission portion 130 is disposed at a position different from the first drive transmission portion 120 in the up-down direction. This structure can further promote a reduction in the size of the printing device 1.

(1d) The drive switching portion 140 can realize switching in transmission route of the drive force between the platen roller 103 and the cutter 107 through a simple configuration.

(1e) The motor output shaft 112 is arranged closer to the insertion opening 101A of the cassette accommodation portion 101 than the motor body 111 is to the insertion opening 101A in the up-down direction. This structure can promote a further reduction in the size of the printing device 1.

Variations and Modifications

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

(2a) The printing device of the disclosure need not be a device configured to use an ink ribbon for printing. For example, the printing device of the disclosure may be a device configured to perform printing on a strip-like thermal paper. In this case, a paper cassette for this printing device need not include an ink ribbon.

Alternatively, the printing device of the disclosure may use a stencil tape as a printing tape therefor, so that a printing pattern can be perforated in the stencil tape with a thermal head. When using a stencil tape as the printing tape, a laminating tape may be used in place of the ink ribbon as an auxiliary tape for protecting the stencil tape.

(2b) In the printing device 1 of the above-described embodiment, each of the first drive transmission portion 120 and the second drive transmission portion 130 has gears. However, the first and second drive transmission portions of the disclosure need not have gears. For example, the first drive transmission portion and the second drive transmission portion of the disclosure may include rotatable bodies other than gears, such as rollers.

(2c) In the printing device 1 of the above embodiment, the first drive transmission portion 120 is positioned above the second drive transmission portion 130. However, the first drive transmission portion of the disclosure may be disposed lower than the second drive transmission portion. Further, the first drive transmission portion of the disclosure need not overlap the second drive transmission portion in the up-down direction.

(2d) The motor output shaft 112 need not be positioned closer to the insertion opening 101A of the cassette accommodation portion 101 than the motor body 111 is to the insertion opening 101A with respect to the up-down direction. Further, the rotational axis of the motor output shaft 112 need not be aligned in the up-down direction.

(2e) In the printing cassette 10 of the embodiment, the drive transmission mechanism 20 may be arranged higher than the printing tape roll 11 or lower than the conveying path for the printing tape 11A. Alternatively, the printing cassette of the disclosure may not include the drive transmission mechanism. In other words, the first drive transmission portion of the disclosure may be configured transmit the drive force directly to the platen gear.

(2f) Functions possessed by a single component in the above-described embodiment may be distributed among a plurality of components, and functions possessed by a plurality of components in the above-described embodiment may be integrated into a single component. Further, some of the parts and components of the described embodiment may be omitted. Still further, at least some of the parts and components in the depicted embodiment may be added to or replaced with those of the above-described variations and modifications. The present disclosure encompasses every aspect included in the technical concepts that can be identified and read from the attached claims.

Remarks

The printing device 1 is an example of a printing device. The printing cassette 10 is an example of a printing cassette. The cassette accommodation portion 101 is an example of a cassette accommodation portion. The platen roller 103 is an example of a platen roller. The cutter 107 is an example of a cutter. The motor 110 is an example of a motor. The first drive transmission portion 120 is an example of a first drive transmission portion. The second drive transmission portion 130 is an example of a second drive transmission portion. The drive switching portion 140 is an example of a drive switching portion. The sun gear 141 is an example of a sun gear of the drive switching portion, and the planetary gear 142 is an example of a planetary gear of the drive switching portion. The insertion opening 101A is an example of an opening of the cassette accommodation portion. The first rotatable body 145A is an example of a first rotatable body of the drive switching portion. The second rotatable body 145B is an example of a second rotatable body of the drive switching portion. The third rotatable body 145C is an example of a third rotatable body of the drive switching portion. The frame 150 is an example of a frame. The third gear 131 is an example of a rotatable body of the second drive transmission portion. The motor body 111 is an example of a motor body, and the motor output shaft 112 is an example of a motor output shaft.

What is claimed is:

1. A printing device comprising:

a cassette accommodation portion to which a printing cassette incorporating a printing tape is detachably attachable;

a platen roller configured to rotate about a rotational axis to convey the printing tape of the printing cassette attached to the cassette accommodation portion;

a cutter configured to cut the printing tape;

a motor configured to generate a drive force;

a first drive transmission portion configured to transmit the drive force of the motor to the platen roller in a state where the printing cassette is attached to the cassette accommodation portion; and a second drive transmission portion configured to transmit the drive force of the motor to the cutter, wherein the motor has at least a portion that overlaps the cassette accommodation portion in a first direction parallel to the rotational axis of the platen roller.

2. The printing device according to claim 1, wherein an entirety of the motor overlaps the cassette accommodation portion in the first direction.

3. The printing device according to claim 1, wherein each of the first drive transmission portion and the second drive transmission portion comprises at least one gear, wherein each gear of the first drive transmission portion has at least a portion that overlaps the cassette accommodation portion in the first direction, and wherein each gear of the second drive transmission portion has at least a portion that overlaps the cassette accommodation portion in the first direction.

4. The printing device according to claim 1, wherein the second drive transmission portion has at least a portion that is arranged at a different position from the first drive transmission portion in the first direction.

5. The printing device according to claim 1, further comprising a drive switching portion configured to selectively transmit the drive force of the motor to the first drive transmission portion or to the second drive transmission portion, the drive switching portion comprising:

a sun gear configured to receive the drive force from the motor; and a planetary gear in mesh with the sun gear and configured to pivotally move about an axis of the sun gear.

6. The printing device according to claim 5, wherein at least one of the sun gear and the planetary gear is a step gear configured of two gears coaxially arranged with each other.

7. The printing device according to claim 5, wherein the cassette accommodation portion defines an opening through which the printing cassette can be inserted into the cassette accommodation portion, and wherein the drive switching portion is positioned closer to the opening of the cassette accommodation portion than a portion of the second drive transmission portion is to the opening in the first direction.

8. The printing device according to claim 1, further comprising a drive switching portion configured to selectively transmit the drive force of the motor to the first drive transmission portion or to the second drive transmission portion, the drive switching portion comprising:

a first rotatable body configured to receive the drive force from the motor and rotatable in a first rotating direction and in a second rotating direction opposite the first rotating direction;

a second rotatable body configured to transmit the drive force received from the first rotatable body to the first drive transmission portion when the first rotatable body rotates in the first rotating direction; and a third rotatable body configured to transmit the drive force received from the first rotatable body to the second drive transmission portion when the first rotatable body rotates in the second rotating direction.

9. The printing device according to claim 8, wherein each of the first rotatable body, the second rotatable body, and the third rotatable body is a gear, and wherein the first rotatable body has gear teeth whose number is different from the number of gear teeth of at least one of the second rotatable body and the third rotatable body.

10. The printing device according to claim 1, further comprising a frame having a plate-like shape, the frame having a plate surface crossing the first direction, wherein the second drive transmission portion comprises a rotatable body configured to transmit the drive force of the motor in the first direction, the rotatable body penetrating through the frame in the first direction.

11. The printing device according to claim 1, wherein the cassette accommodation portion defines an opening through which the printing cassette can be inserted into the cassette accommodation portion, and wherein the motor comprises:

a motor body configured to generate the drive force; and a motor output shaft rotatable about an axis thereof together with the motor body, the motor output shaft being positioned closer to the opening of the cassette accommodation portion than the motor body is to the opening in the first direction.

12. The printing device according to claim 11, wherein the motor body has at least a portion that is arranged at the same position as the second drive transmission portion in the first direction.

13. The printing device according to claim 11, wherein the motor output shaft has at least a portion that is arranged at the same position as the first drive transmission portion in the first direction.

* * * * *